Jan. 19, 1971 ERNST-DIETER KILLIAN 3,556,673
ROTOR MOUNTING
Filed Oct. 11, 1968 2 Sheets-Sheet 1

INVENTOR

By Ernst-Dieter Kilian

*McGlew and Toren*
ATTORNEYS

United States Patent Office 3,556,673
Patented Jan. 19, 1971

3,556,673
ROTOR MOUNTING
Ernst-Dieter Kilian, Munich, Germany, assignor to Bolkow Gesellschaft mit beschrankter Haftung, Munich, Germany
Filed Oct. 11, 1968, Ser. No. 766,780
Int. Cl. C64c 27/38
U.S. Cl. 416—134       11 Claims

ABSTRACT OF THE DISCLOSURE

A rotor for gyroplanes having rotor blades of a type which absorb, by their material structure, the forces from pivotal (swivel) or bending (wobble) moments, comprises a jointless mounting at the rotor head having means at its radial outer end for mounting each rotor blade. The mounting is made up of a plurality of laminated rubber-metal bearings having a layer structure arranged substantially normal to the maximum occurring bearing force components or the resultant of such components.

SUMMARY OF THE INVENTION

This invention relates, in general, to the construction of rotors for gyroplanes and, in particular, to a new and useful rotor construction and mounting particularly for rotors having blades of a material capable of absorbing wobble and swivel moments by their elastic deformation and wherein the mounting includes a plurality of laminated layers of elastic material and metal which forms bearings.

It is known to construct rotors for gyroplanes or helicopters which include connections for the blades without pivotal (swivel) or bending (wobble) mounting joints by using structural parts which permit the necessary pivoting and bending movements. One such construction employs the suspension of the rotor blades on elastic spring bands. Such spring bands absorb the centrifugal forces and permit a wobble and swivel movement as well as the controlled angular movement of the blade. A characteristic of such arrangements which may be regarded as disadvantageous is that the spring bands are not self-damping, so that at least in the pivoting direction, additional damper elements must be provided. It is also known to construct the rotor blade mountings with a laminated rubber-metal bearing or so-called elastomeric bearings. These elastomeric bearings permit the wobble, swivel and angular movement of the rotor blades and at the same time they provide a damping action. The stratification of the elastomeric bearings occurs essentially in a direction of the centrifugal forces so that the centrifugal forces act in a direction normal to the rubber or elastic layers. The composite movement of the rotor blades, however, result in a strong tangential stress on the elastic material or rubber layers so that many such layers are required or the modulus of shear of the rubber or elastic material must be correspondingly low in order not to exceed the permissible shear stresses in this material. This requirement, however, is in opposition to a requirement for stiffness in the swivel direction which must be provided in order to attain an effective swivel damping. A further disadvantage of the known arrangements is that the elastomeric bearing must transmit the transverse forces of the rotor blade to the rotor head so that the rubber layers undergo shear loads by transverse forces in addition to the shear loads from the blade moments and the angle control.

In accordance with the present invention, there is provided an improved rotor construction and a blade mounting arrangement which includes a plurality of elastomeric bearings which are arranged so that the loads acting on the rotor blades will be kept away from the bearings but the remaining loads are absorbed as compressive forces which act normal to the layer structures of these bearings. Rotor blades are employed which absorb the wobble and swivel moments by the elastic deformation of the rotor blade materials. The mounting for the blades includes a plurality of laminated rubber-metal bearings which have layer structure arranged essentially normal to the maximum occurring bearing force components or the resultants thereof. By using a rotor blade, which will absorb the stresses due to the wobble and swivel movement of the blade, only one type of movement of the blade will occur at the elastomeric bearing, namely, the annular movement of the blade. This provides a major advantage in that the swivel and the wobble stiffness of the elastomeric bearing need no longer be adjusted for these two types of stresses and to the stiffness in a direction normal to the bearing. Instead, a bearing arrangement may be provided which has any desired softness in relation to the angular displacement of the blade but is very stiff in relation to the centrifugal forces and the blade moments. This latter requirement is easy to fulfill and is excellently realized by using a plurality of laminated bearings arranged in a substantially radial bearing direction in the mounting structure at the rotor head.

The elastomeric bearings which are provided are arranged so that the centrifugal force component and the fourth couples originating from the blade moments are absorbed by them in a direction normal to the layer structure thereof, or the elastomeric bearings are arranged substantially perpendicular to the maximum occurring resultants from centrifugal and moment loads.

In accordance with one embodiment of the invention, there is provided for each blade at least one axial bearing for the absorption of forces acting in the longitudinal direction of the blade and two radial bearings for the forces acting normal to the longitudinal direction of the blade. The radial bearings are spaced along the longitudinal axis by an amount such that permissible bearing forces resulting from the blade moments and the transverse forces will not be exceeded.

In accordance with a further feature of the invention, the axial bearings are formed within two interengaged yokes or link members arranged in the manner of a link chain. The first link member is connected with the rotor blade and the second is connected with the rotor head. An axial bearing defined in the link member which is connected to the blade is loaded as a thrust bearing. An advantage of the arrangement is that even when the bearings falls out, the blade cannot become detached under the action of the centrifugal forces and fly away. The axial bearing is set under permanent prestress by a clamping bearing which is designed as a laminated rubber-metal bearing. With such a construction, the bearing may be prestressed so that even without any acting centrifugal forces and under the influence of deadweight of the blade, for example, with the rotor standing still, the axial bearing or a zone thereof will never be under tensile stress.

In another embodiment of the invention, two elastomeric bearings are arranged in spaced location in the direction of the longitudinal axis of the blade and they are formed as truncated cones. The inclination of the cone faces is so selected that the maximum forces acting on the faces will be approximately perpendicular to the layer structure of the elastomeric bearings. These forces are calculated as the resultant from the centrifugal force, the force couples originating from the blade moments, and the transverse force acting on the blade.

According to another feature of the invention, a prestress in the longitudinal direction of the blade is applied to the bearing absorbing the centrifugal forces by a tension rod which is passed centrally through the bearing.

Accordingly, it is an object of the invention to provide a rotor construction and particularly a mounting for the rotor blades on the rotor head for use with rotor blades having a construction such that they absorb the wobble and swivel moments by their elastic deformation, comprising a plurality of laminated elastomeric bearings having layer structures arranged substantially normal to the maximum occurring bearing force components or the resultants of such components.

A further object of the invention is to provide a rotor blade mounting formed by a plurality of interengaged links extending in the direction of the longitudinal axis of the rotor blade and which include journals which are supported by elastomeric bearings having layer structures which extend normal to the forces acting due to the centrifugal forces of the blade moments.

A further object of the invention is to provide a mounting for rotor blades which includes a plurality of interlinked members having journals which are supported by elastomeric bearings made up of a plurality of layers of alternately arranged metal and elastic layers, and wherein an axial thrust bearing is provided with means for tensioning the bearing to provide for play between the interengaged parts of the mounting to avoid undue bending stress when the rotor is not rotating.

A further object of the invention is to provide a rotor construction which includes a plurality of laminated elastic material and metal bearings of conical configuration at spaced locations in respect to the longitudinal axis of the blade and including means such as a tension bolt extending through the bearings for prestressing them.

A further object of the invention is to provide a rotor construction and a mounting for rotor blades which are simple in design, rugged in construction and economical to manufacture.

The various features of novelty which characterize the invention are pointed out with particularity in the claims annexed to and forming a part of this specification. For better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
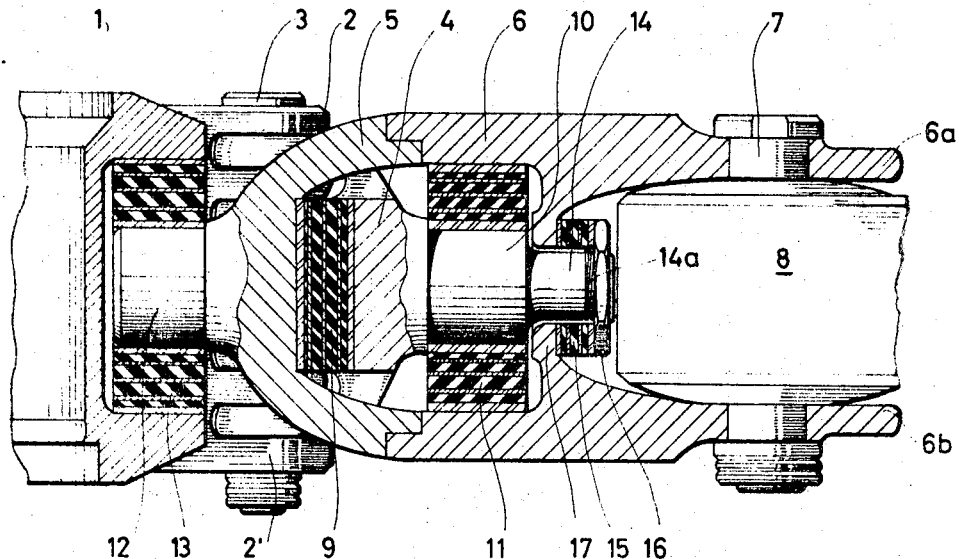
FIG. 1 is a partial longitudinal section extending in a vertical plane through a rotor arm in the area of the blade connection to the rotor head constructed in accordance with the invention.
Figure 2:
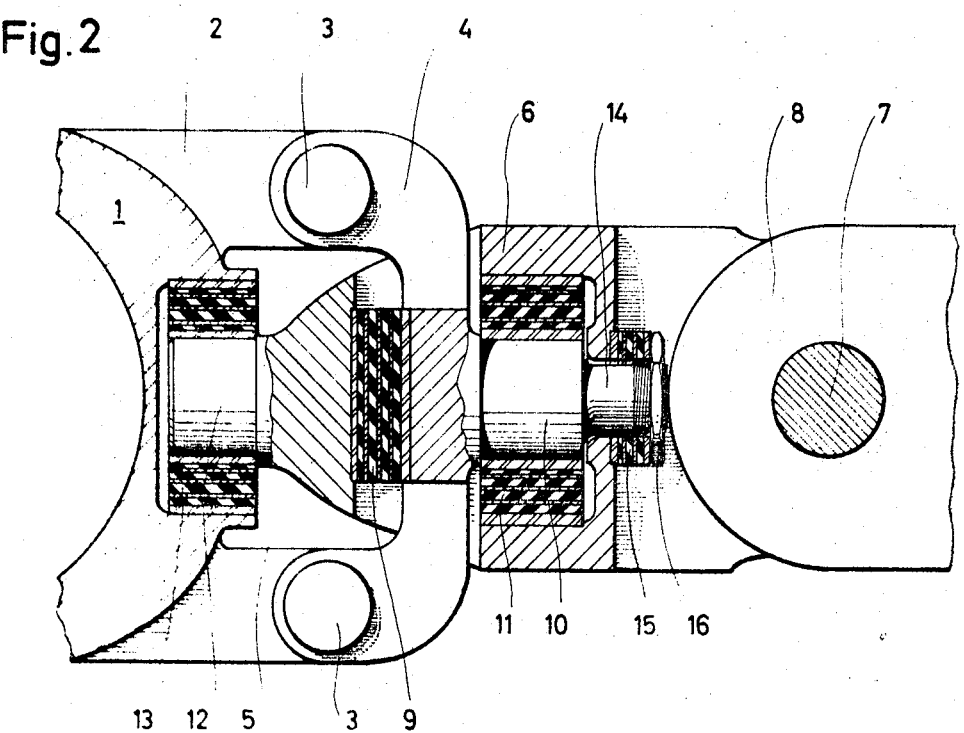
FIG. 2 is a section similar to FIG. 1, but in a horizontal plane.

Referring to the drawings, in particular, the invention embodied therein in FIGS. 1 and 2, comprises a mounting for a rotor head 1 for a helicopter or gyroplane having a blade 8 constructed of a material which is capable of absorbing wobble and swivel moments by its elastic deformation.

In accordance with the invention, the rotor head 1 is provided with vertically spaced attachment plates 2 and 2' to which is secured a yoke member 4 by means of securing bolts 3. The yoke member 4 and the rotor head, including the attachment plates 2 and 2', form an eyelet, or first link configuration, in the horizontal plane. Through this first link, or eyelet, a yoke 5 is passed and this yoke includes an intermediate piece 6 formed as an extension thereof which is provided with vertically-spaced open legs 6a and 6b which receive the rotor blade 8, the latter being held therein by an attachment bolt 7. The yoke 5, together with its intermediate piece 6, forms a second link into which the yoke 4 extends.

The centrifugal forces which act in operation of the rotor blade 8 are transmitted through the yoke 5 and a laminated elastomeric bearing 9 of alternate rubber and metal layers through the yoke 4 and hence to the rotor head 1. The layer structure of the elastomeric bearing 9 is such that the layers extend perpendicular to the centrifugal forces which act. The bonding of the rubber layers and the metal layers of the elastomeric bearing 9 is made over the entire area and it acts to provide a complete clamping of the assembly so that because of its incompressibility, the rubber cannot yield under the pressure of the forces acting thereon. Under a load normal to the layers therefor the elastomeric bearing may be regarded as nonresilient.

The moments which act on the blade 8 are transmitted through a journal 10 of the yoke 4 which is mounted in an annular elastomeric bearing 11 and a journal 12 of the yoke 5 which is mounted in an annular elastomeric bearing 13 which is mounted in the recess defined between the arm plates 2 and 2'. As best seen in FIG. 2, the elastomeric bearing 11 is located within the hollow defined by the intermediate piece 6 adjacent a collar portion 17 therein. The layer structures of the elastomeric bearings 11 and 13 are similar to that of the structure 9, but they are arranged in a radial direction, that is, the forces produced from the blade moments and from the transverse forces will always act perpendicular to these layers.

With the arrangement described, the blade 8 is rigidly suspended with respect to centrifugal forces, wobble and swivel moments, and transverse forces. An angular movement of the blade is possible without great control forces because of the softness of the elastomeric bearings in respect to thrust forces. The wobble and swivel movement of the blade 8 is possible by the elastic deformation of the blade.

In accordance with a further feature of the invention, the journal 10 is provided with an extension or prolongation 14 of smaller diameter which extends through an opening within the collar 17 of the intermediate piece 6 and has an outer end which is threaded at 14a. An annular elastomeric clamping bearing 15 is directed over the end portion of the journal extension 14 and abuts against the exterior portion of the collar 17. The journal 14 is pretensioned by the application of a clamping nut 16 over the threaded end portion 14a so that the bearing 15 is pressed against the collar 17. This also causes a prestressing of the elastomeric bearing 9 and insures that the bearing will not be under tensile load at pure moment load of the blades 8 as would occur when the rotor is standing still under the influence of the deadweight of the blade. The annular elastomeric bearing 15 has a layer structure which extends in an axial direction in respect to the axis of the blade 8.

Figure 3:
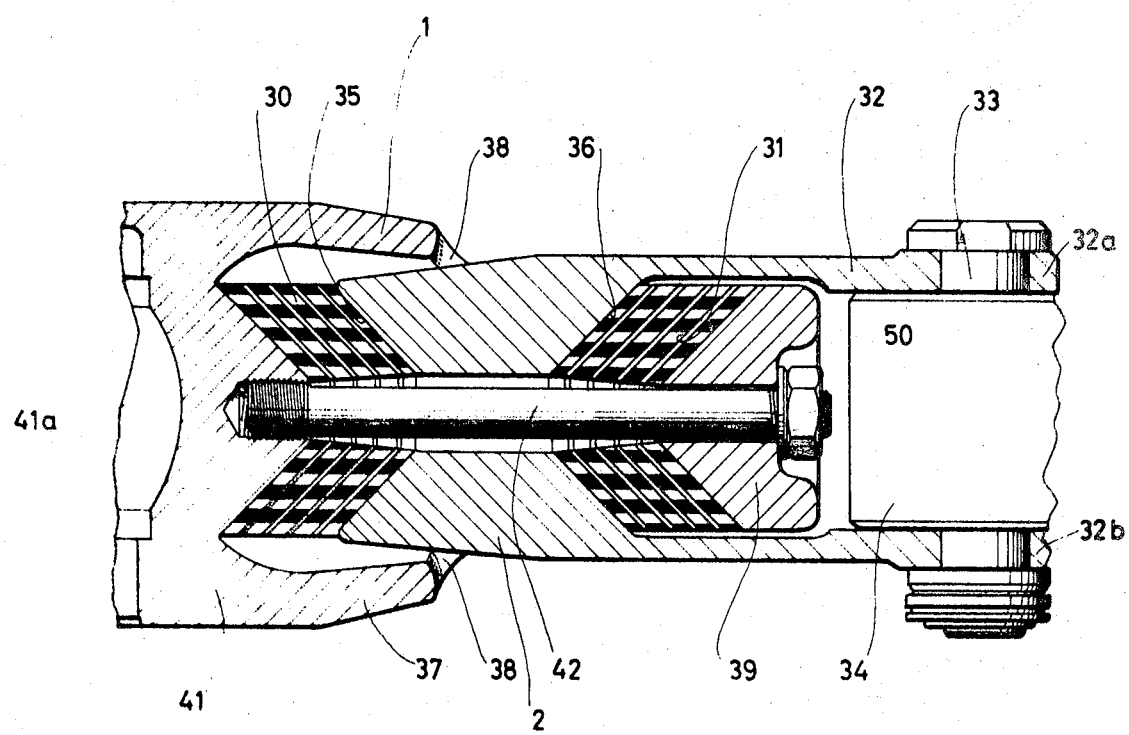
FIG. 3 is a longitudinal section in a vertical plane similar to FIG. 1, but of another embodiment of a rotor head construction.

In the embodiment illustrated in FIG. 3, two conical bearings are employed instead of the system of axial and radial bearings of FIGS. 1 and 2. In this embodiment, the rotor head 41 is formed as a yoke or link 37 at the location for the mounting of each blade. The yoke 37 includes legs 38 with suitable disconnecting pieces (not shown) and an end piece 39 which is looped through or engages into a blade connection piece 32 which forms an eyelet or a link interengaged with the yoke 37 in chain link fashion. The blade connection piece 32 is provided with spaced leg portions 32a and 32b between which a rotor blade 34 extends. The rotor blade is secured by means of a bolt 33 which extends through the leg portions 32a and 32b.

In accordance with a feature of the structure of the embodiment of FIG. 3, the blade connection piece is provided with oblique oppositely extending surfaces 35 and 36 which form conical contact faces against which the elastomeric bearings 30 and 31 apply. A tension rod 42 is arranged to extend centrally through the end portion 39 of the yoke 37 and through the inner end of the blade connecting piece 32 and is anchored into a central portion 41a of each mounting piece for the rotor 41. When the tension rod 42 is tensioned as by the tightening of the nut 50, or by the further threading of the rod 32 into the central portion 41a, there is a prestressing of the elastomeric bearings 30 and 31. This insures free play when the rotor is standing still.

The angles of the conical elastomeric bearings 30 and 31 are selected so that the maximum resulting forces will be substantially perpendicular to the layers which form these bearings. The amount of spacing of the conical bearings along the longitudinal axis of the blade forms the basis for the absorption of the blade moments. The centrifugal forces load the bearing 31 principally in an axial direction while the transverse forces act on both bearings in a radial direction.

What is claimed is:

1. A rotor construction for a gyroplane having blades of a material capable of absorbing wobble and swivel moments by elastic deformation, comprising a rotor head, jointless mounting means for each blade mounting said blades on said head and defining a plurality of bearing recesses at spaced locations in respect to the longitudinal axis of the rotor blades, and at least one elasomeric bearing made up of a plurality of alternately arranged layers of rigid and elastic material arranged in each of said recesses and oriented so that their layer structure is substantially normal to the occurring bearing force components.

2. A rotor, according to claim 1, including at least one axially arranged elastomeric bearing for the absorption of forces acting in the longitudinal direction of the rotor blade and at least two radially arranged elastomeric bearings for the forces acting normal to the longitudinal direction of the blade.

3. A rotor, according to claim 1, wherein said means defining a plurality of bearing recesses include a first link-forming yoke member connected to the rotor head, a second link-forming yoke member interlooped with said first link member and adapted to be connected to the rotor blade.

4. A rotor, according to claim 3, wherein said first yoke-forming link member is provided with a journal, said yoke-forming link member carrying an elastomeric bearing surrounding said journal, clamping means bearing against said second link-forming yoke member and connected to said journal of said first link-forming yoke member to prestress said first link-forming yoke member and a transverse elastomeric bearing disposed between said first link-forming yoke member and said second link-forming yoke member.

5. A rotor, according to claim 1, wherein said elastomeric bearings are of substantially truncated conical shape.

6. A rotor, according to claim 5, including means for prestressing said conical bearings.

7. A rotor blade mounting construction without pivoting and beating joints for a rotor head of a gyroplane having blades of material capable of absorbing wobble and swivel moments by elastic deformation, comprising a first link-forming yoke member adapted to be secured to the rotor head, a second link-forming yoke member interlooped with said first link-forming member and extending longitudinally in respect to the blade axis from said first link-forming yoke member, first bearing means defined between said first link-forming yoke member and said second link-forming yoke member adjacent the connection of said first link-forming member to the head, second bearing means defined between said first link-forming yoke member and said second link-forming yoke member at a spaced location from said first bearing means and at the opposite loop end of said yoke members, said first and second bearing means comprising a plurality of alternately arranged layers of rigid and elastic material having the layers oriented so that they are normal to the occurring bearing forces mounting said rotor blade on said head.

8. A rotor construction, according to claim 7 wherein said first link-forming yoke member includes a journal end-portion extending in a direction outwardly from said head and into the link formed by said second link-forming yoke member, a first annular bearing surrounding said first link-forming yoke member journal end-portion and held within said second link-forming yoke member, said second link-forming yoke member having a journal portion extending in a direction inwardly to said and into said first link-forming yoke member at the location of the rotor head, and a second elastomeric bearing of annular configuration surrounding said journal of said second link-forming yoke member and located within said first link-forming yoke member.

9. A rotor construction, according to claim 7, wherein said first link-forming yoke member comprises an extension of the rotor head, said second link-forming member having a wall portion which is looped into said first link-forming yoke member and which has oppositely extending truncated conical bearing surfaces, said first bearing means being disposed against one of said bearing surfaces on one side of said second link-forming yoke member wall position, said second bearing means being disposed to bear against the other of said bearing surfaces on the other side of said wall of said second link-forming yoke member.

10. A rotor construction, according to claim 9 including a tension bolt extending through the outer portion of said first link-forming yoke member and through said looped wall portion of said second link-forming yoke member and into the inner portion of said first link-forming yoke member to tension said two members together over said first and second bearings.

11. A rotor construction, according to claim 7, wherein said first bearing is contained within said first link-forming yoke member, said second link-forming yoke member having a second journal extending into said first bearing and supported thereby, said second bearing being located in said second link-forming yoke member, said second link-forming yoke member having a first journal extending into said second bearing and supported thereby, said first journal having an extension journal portion, said link-forming yoke member having a collar with an opening through which said first journal portion extends, an elastomeric clamping ring surrounding the portion of said first journal which extends through the opening defined by said collar, clamping means bearing against said elastomeric clamping ring to prestress said first link-forming yoke member, and a transverse elastomeric bearing disposed between said second link-forming yoke member and said first link-forming yoke member and being prestressed by the clamping of said extending journal portion.

References Cited

UNITED STATES PATENTS

| 3,106,965 | 10/1963 | Gorndt et al. | 170—160.53 |
| 3,111,172 | 11/1963 | Gorndt et al. | 170—160.53 |
| 3,282,350 | 11/1966 | Kisovec | 170—160.53 |
| 3,292,712 | 12/1966 | Schmidt | 170—160.55 |

EVERETTE A. POWELL, JR., Primary Examiner

U.S. Cl. X.R.

416—141